United States Patent [19]

Sharpe

[11] 3,790,882

[45] Feb. 5, 1974

[54] DIP MAGNET MAGNETOMETER HAVING A DAMPED PENDULOUS SUPPORT AND TEMPERATURE COMPENSATION

[75] Inventor: Edgar John Sharpe, Willowdale, Ontario, Canada

[73] Assignee: Coniagas Research Inc., Toronto, Ontario, Canada

[22] Filed: Jan. 8, 1973

[21] Appl. No.: 321,759

[30] Foreign Application Priority Data
Nov. 30, 1972   Canada .............................. 158009

[52] U.S. Cl. ....................... 324/48, 33/346, 33/364
[51] Int. Cl. ............................................. G01r 33/02
[58] Field of Search ....... 324/48, 43 R; 33/346, 364

[56] References Cited
UNITED STATES PATENTS
2,428,346   9/1947   White ................................. 33/346
2,541,213   2/1951   Davidson ............................ 324/48
3,462,830   8/1969   Sharpe ................................ 324/48

FOREIGN PATENTS OR APPLICATIONS
509,940   7/1939   Great Britain ....................... 33/364

*Primary Examiner*—Robert J. Corcoran

[57] ABSTRACT

This invention relates to a magnetometer having a dip magnet housing pivotally mounted on a damping base in a chamber filled with damping fluid. The damping base has an index means which has a zero reference line that overlies the locus of the end of a pointer carried by the dip magnet housing and the locus of the end of the pointer carried by the dip magnet housing has a direction that traverses the zero reference line. A viewing system overlies the index means and has a field of view that includes the zero reference line and the locus of the end of the pointer. A dip compensating magnet is adjusted as to position to rotate the dip magnet housing to align the pointer with zero reference line and the movement of the compensating magnet is an indication of the earth's magnetic field.

5 Claims, 3 Drawing Figures

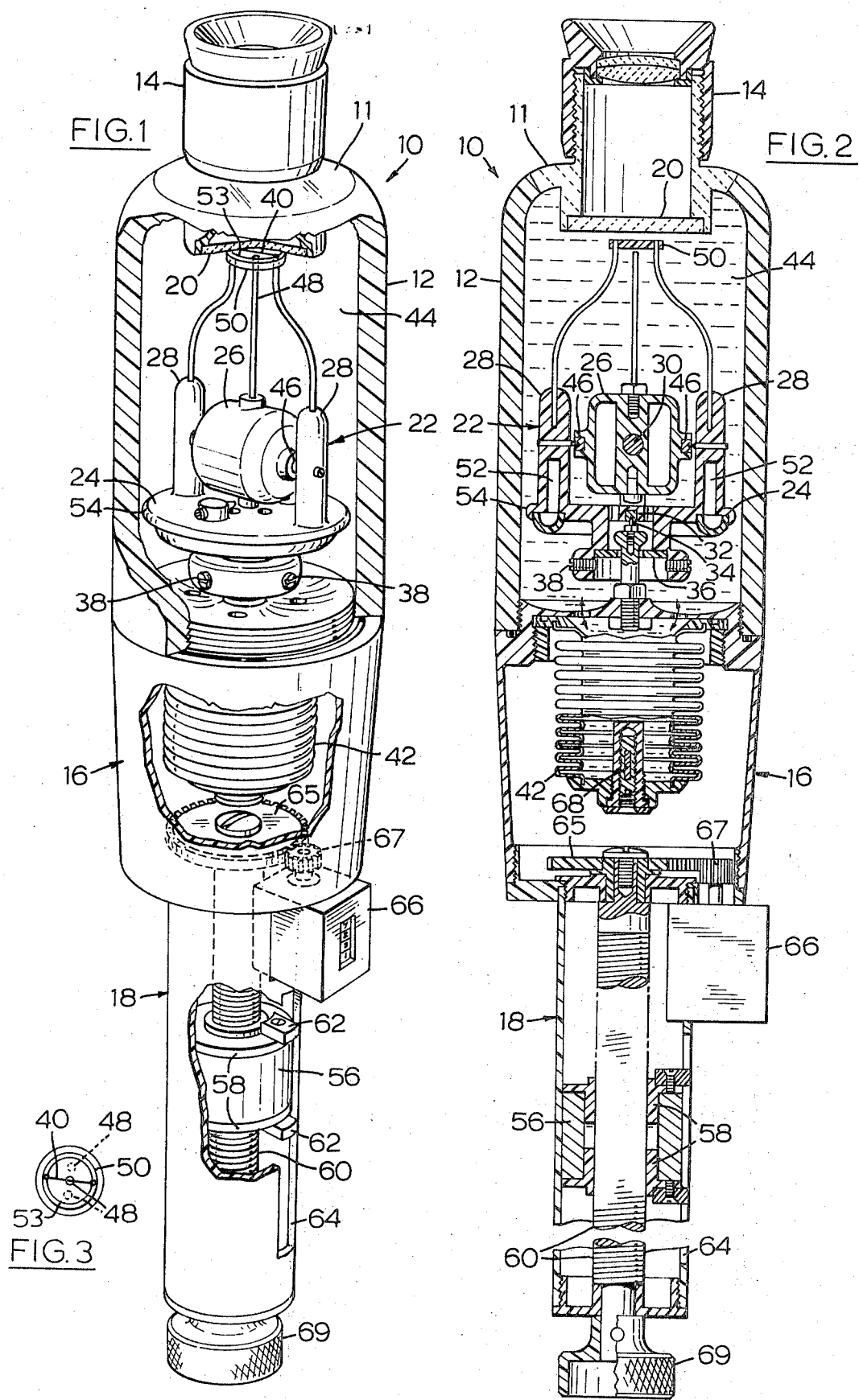

DIP MAGNET MAGNETOMETER HAVING A DAMPED PENDULOUS SUPPORT AND TEMPERATURE COMPENSATION

This invention relates to a self-levelling, self-orienting magnetometer for measuring the vertical intensity of the earth's magnetic field.

It is an object of the invention to provide a simple, rugged and reliable magnetometer for measuring the vertical intensity of the earth's magnetic field that can be used by relatively inexperienced operators.

Self-levelling, self-orienting magnetometers of the type that can be held in the hand under operating conditions are not broadly new. Most of them take an appreciable time to level and there is a certain amount of oscillation of the zero reference line with respect to the dip magnet needle. An experienced operator can, by taking time, obtain an accurate reading but an inexperienced operator often obtains an inaccurate reading. The present invention has a dip magnet assembly that has a damping base that levels and orients the dip magnet assembly with a minimum of oscillation.

A further difficulty with portable magnetometers has been variation in sensitivity with temperature. The present invention provides for a temperature compensating magnet that compensates for variations in strength of the dip magnet's magnetic field with temperature automatically.

At the same time the dip magnet housing is mounted for dip movement on the damping base so that it substantially neutrally buoyant to relieve stresses on its bearings.

A magnetometer according to the present invention comprises a casing, a dip magnet assembly, said dip magnet assembly having a dip magnet housing and a damping base, said dip magnet housing having a dip magnet therein, said dip magnet housing of said dip magnet assembly being mounted on said damping base of said dip magnet assembly for dip movement of said magnet, said casing having a chamber for magnet assembly, said chamber for said magnet assembly having a vertical pivot bearing for said damping base of said dip magnet assembly, said damping base having a bearing seat balanced on said vertical pivot bearing and free for rotation in azimuth, said magnet assembly being pendulous about said pivot bearing, an index means having a zero reference line carried by said damping base of said dip magnet assembly, a pointer carried by said dip magnet housing of said dip magnet assembly referable to said zero reference line, a dip compensating magnet on said casing in compensating proximity to said dip magnet, means for adjusting the proximity of said dip compensating magnet with respect to said dip magnet to align said pointer with respect to said zero reference line, means for measuring the proximity of said dip compensating magnet to said dip magnet, means on said casing for viewing said zero reference line relative to the casing and the relation thereto of said pointer, said chamber for said magnet assembly being filled with a damping fluid for said magnet assembly, said damping base having a damping annulus that extends outwardly of said bearing seat thereof to frictionally dampen pendulous oscillation of said magnet assembly about said pivot point, said dip magnet housing being of greater buoyancy in said damping fluid than said damping base. The invention will be clearly understood after reference to the following detailed specification read in conjunction with the drawings.

In the drawings:

FIG. 1 is a view of a magnetometer according to the present invention with the casing broken away to illustrate the construction;

FIG. 2 is a sectional view through the magnetometer; and

FIG. 3 is a view of the index means and pointer as viewed through the eye piece in use.

The magnetometer illustrated has a body generally indicated by the numeral 10 that comprises a housing 12 for the dip magnet assembly, a housing 14 for the viewing lens assembly, a housing 16 for the temperature compensating bellows and a housing 18 for the dip compensating magnet assembly. The component housings of the body are preferably made from plastics materials and threaded together as illustrated in the drawings.

Housing 12 for the dip magnet assembly is sealed at the top by a transparent plastic disc 20. The housing is preferably made from a translucent plastics material and painted with an opaque paint except at an annular window area 11 at the top which is adapted to admit light to the pointer and the index means as will be described later.

The dip magnet assembly generally indicated by the numeral 22 comprises a damping base 24 and a dip magnet housing 26 that is swingably mounted between the upwardly extending arms 28 of the base for dip movement of the magnet 30 that is carried thereby. Base 24 carries a jewelled bearing 32 that sits on needle 34 which is in turn rigidly mounted on the top of housing section 16 as illustrated.

The dip magnet assembly 22 as a whole is pendulous about needle 34 and is free for rotation in azimuth and limited rocking movement with respect to needle 34. It is free to level when the casing is held vertically. The chamber within which the dip magnet assembly is mounted is filled with a damping fluid to dampen the oscillation of the pendulous magnet assembly about needle 34. Numeral 36 refers to a disc which is designed to cooperate with the enlarged head of the post that supports needle 34 to prevent the dip magnet assembly from becoming dislodged from its mounting post 34 when the instrument is in a position other than a vertical one.

Numeral 38 refers to four equally spaced balancing screws which are designed to add weight to the lower extremity of the dip magnet assembly for pendulosity and to balance it so that the index means is in a level position when the longitudinal axis of the magnet 30 is in a horizontal position and the instrument is in a vertical position.

As indicated, the dip magnet assembly chamber is filled with a damping liquid. This liquid expands and contracts with temperature changes and a compensating bellows 42, the interior of which communicates with the dip magnet assembly chamber is provided to take up this expansion and contraction of the damping fluid with the temperature changes. The interior of the bellows communicates with the chamber so that both the chamber and the bellows are filled with liquid. This feature of itself is not new and instruments of this type are general.

The dip magnet assembly 22, as noted above, comprises a dip magnet housing 26 and a damping base therefor 24. The dip magnet housing is made from a plastics material and has a cylindrical opening therein which is adapted to retain the dip magnet 30. Dip magnet 30 is a permanent type magnet having a diameter of about 3/16 of an inch and a length of about 0.8 of an inch. The selection of an appropriate magnet will not be difficult for a person skilled in the art. An Alnico 5 permanent magnet of the above noted dimensions has worked satisfactorily in a prototype instrument. The dip magnet housing has hollow air spaces and is designed to be substantially neutrally buoyant in the damping fluid 44 of the chamber. It is mounted for dip movement on the jewelled bearings of the upwardly extending arms of the damping base 24 as illustrated at 46. The neutral buoyancy of the dip magnet assembly is adapted to relieve stress on its bearing mounting in the damping base.

The fluid 44 for the chamber is mixed from a silicone fluid having a density of about 0.86 and a fluoralube fluid having a density of about 1.8. The current mixture is achieved by placing the dip magnet housing in the silicone fluid and adding the more dense fluoralube fluid until the dip magnet assembly just begins to rise in the fluid. It is thus just slightly buoyant.

An indicating pointer 48 extends upwardly from the dip magnet housing and cooperates with the zero reference line 40 of the index means in a manner which will be explained later.

The damping base 24 of the dip magnet assembly is, as previously explained, pendulously balanced about the needle 34. It is also made of a plastics material that has a density of about 1.2. The density of the resultant fluid within which the dip magnet housing is substantially neutrally buoyant is usually in the area of 1.2 to 1.4. Thus, it is the four equally spaced apart weights 38 of the damping base that tend to weight the lower end thereof and to make it pendulous. They are also adjusted as to position in a lateral direction to center the index means of the damping base when the casing is in a vertical position and when the magnet 30 is in a horizontal position. It will be noted that index means comprises a circle 53 scribed on the marginal area of the round disc 50 and a zero reference line 40 extending diametrically across the circle. The disc is carried by upwardly extending arms of the damping base. When centered, it can be viewed through the eye piece of the viewing assembly 14 and its appearance is substantially as shown in FIG. 3.

The upwardly extending arms of the damping base have hollow air chambers 52 to reduce the weight of the upper extremities thereof. It will be apparent that once properly balanced the damping base will level itself on the needle 34 and that when the circle 53 that extends around the disc 50 is centered in the viewing area of the eye piece 14, both the instrument casing and the damping base are in a level position.

The damping base 24 has a laterally extending platform or annulus 54 which extends outwardly of the bearing seat 32 and in use frictionally dampens the pendulous oscillation of the dip magnet assembly about the pivot pin 34. It has been found that a platform 54 having a diameter of about 1¾ inches does an effective job of damping the oscillation of the dip magnet assembly about the pivot point. It will be apparent that a reliable reading can not be taken if the dip magnet assembly is oscillating. Some variation in the proportions of the damping platform are possible. One could, for example, reduce the size and also reduce damping effect. A reasonable result has been obtained with a damping platform having a diameter of about 1¼ inches but a very much improved result was obtained with a damping platform of about 1¾ inches.

The present magnetometer is in principle similar to all magnetometers in that the dip magnet 30 is free to rotate in azimuth and to dip. It is free to dip and its tendency will be to dip with the magnetic field. The vertical component or dip of the magnetic field is measured by providing a dip compensating magnet in levelling proximity to the dip magnet which will under any condition of measurement react against the dip magnet to force it to a level position. In the present magnetometer, the numeral 56 refers to a dip compensating magnet. It is cylindrical in form and retained between two nuts 58 that thread on the shank of threaded shaft 60. Pawls 62 are secured to the nuts and enter a longitudinally extending slot 64 in the dip compensating magnet housing 18. The shank 64 is rotatably mounted at each of its ends in the housing as illustrated so that by rotating the knob 62 on the free end of the threaded shank 60, one can cause the magnet 56 to move up or down the housing 18 as the pawls 62 ride in the slot 64.

The north-south axis of the dip compensating magnet is aligned with the axis of the instrument and in the event that the dip magnet 30 should dip from the horizontal it will be apparent that the poles of the dip compensating magnet can be arranged to force the dipped pole back to its horizontal position. By manipulation of the polarities and separation of the two magnets, it is always possible to adjust the dip magnet to a horizontal position for dips in any particular hemisphere. The interaction of dip compensating magnets and dip magnets in magnetometers is well known to those skilled in the art and is not explained in detail in this application.

As is well known, the measurement of the vertical component of the earth's magnetic field in a magnetometer is achieved by measuring the amount of movement of the dip compensating magnet to achieve the level position of the dip magnet as the instrument is moved from station to station. In the present invention, the threaded shaft 60 has a gear 65 on the free end thereof which engages with a pinion gear 67 of the digital counter 66. Thus, as the dip compensating magnet 56 is caused to move up or down the shaft 60 to take it into or out of proximity to the dip magnet 30. The amount of movement is measured by the digital counter 66.

The strength of the dip magnet varies with temperature. It is known that as the temperature goes down, strength increases. To compensate for this variation of the magnetic field strength with temperature, applicant has provided a temperature compensating magnet 68 that is mounted on the bellows for automatic movement with the bellows along the axis of the instrument.

In the event of a large drop in temperature, the strength of the dip magnet increases and a greater dip results from the movement of the instrument between two stations that have different vertical components of magnetic field. If the magnetometer is to give a constant reading under all temperature conditions, a greater repelling force by the dip compensating magnet is necessary in order to restore the dip magnet 30 to a horizontal position. To automatically provide for this increase in dip compensation, the temperature dip compensating magnet 68 is mounted as above explained to assist the dip compensating magnet 58. It will be apparent that with a drop in temperature, the liquid in the chamber 44 will contract and that the bellows will move upwardly towards the chamber. As the bellows 42 moves in an upward direction, it carries the temperature compensating magnet 68 towards the dip needle to increase the dip compensating effect thereof. It has been found that with a temperature compensating magnet 68 that a temperature co-efficient of less than two gamas per degree centigrade can be achieved.

The sizes of the temperature compensating magnet and the dip compensating magnet can be selected by those skilled in the art to achieve the purpose described herein. However, in the prototype successfully built by the applicant, the temperature compensating magnet was a magnet 1/16 of an inch in diamter and 1/8 of an inch in length of the Alnico 5 specification. The dip compensating magnet had an outside diameter of about one inch, a bore of about 5/8 of an inch and a length of about one inch. It was also of the Alnico 5 permanent magnet specification.

The digital counter 66 is calibrated in gammas per digit. The sensitivity will vary over the range of the instrument. For example, at one end of the scale the sensitivity is in the order of 10 gammas per digit and at the other end of the scale, it is in the order of 30 gammas per digit. However, it is reasonably constant over an extent of 100 digits and most surveys do not involve differences of over 100 digits. In any event, a chart showing the digital counter readings at intervals with corresponding gamma values is prepared for each instrument as is customary in magnetometer calibration. This is not described in detail in this specification since magnetometer calibration is well known to those skilled in the art.

In order to use the instrument one hand holds it in a vertical position to center the ring 53 of the index means in the circular viewing area of the eye piece 14. This insures that the instrument is level. If the dip needle 30 is in a horizontal position, the tip of the pointer 48 thereof will underly the zero reference line 40 of the index means, in the eye piece as illustrated in FIG. 2. If the dip magnet 30 is not in a horizontal position, the tip of the pointer 48 will be visible to one or other side of the zero reference line 40 as illustrated in dotted positions in FIG. 3. In either event, one rotates the knob 69 of the shaft 60 to move the dip compensating magnet 56 to bring the dip magnet into a horizontal position and the tip of the pointer 48 in an underlying position with respect to the zero reference line 40. In this position a reading on the digital counter 66 is made at a station. The procedure is repeated at other stations and readings taken. Differences in readings from station to station are indicative of differences in the vertical component of the earth's magnetic field.

The dip magnet assembly can be quickly levelled with a minimum of oscillation because of the damping effect of the laterally extending dip magnet housing and the readily readable level locating circle of the index means. The neutrally buoyant dip magnet assembly is highly responsive so that accurate readings can be taken with a minimum of experience and time.

What I claim as my invention is:

1. A magnetometer comprising a casing, a dip magnet assembly, said dip magnet assembly having a dip magnet housing and a damping base, said dip magnet housing having a dip magnet therein, said dip magnet housing of said dip magnet assembly being pivotally mounted on said damping base of said dip magnet assembly for dip movement of said magnet, said casing having a chamber for said magnet assembly, said chamber for said magnet assembly having a vertical pivot bearing for said damping base of said dip magnet assembly, said damping base having a bearing seat balanced on said vertical pivot bearing and free for rotation in azimuth, index means carried by said damping base and having a zero reference line inscribed thereon and being positioned to overhang the dip magnet housing, a pointer carried by said dip magnet housing of said dip magnet assembly having an end, the locus of the end of said pointer, as said dip magnet housing pivots on said damping base, being a locus line that underlies said zero reference line and that has a direction that traverses said zero reference line, a dip compensating magnet on said casing, means for adjusting the proximity of said dip compensating magnet with respect to said dip magnet to align the end of said pointer with respect to said zero reference line means for measuring the proximity of said dip compensating magnet to said dip magnet, a viewing lens system on the top of said casing overlying said zero reference line and the said locus line of the end of said pointer, said zero reference line and the locus of the free end of said pointer being in the field of view of said viewing lens system, said chamber for said magnet assembly being filled with a damping fluid for said magnet assembly, said damping base having a damping annulus that extends outwardly of said bearing seat thereof to frictionally dampen pendulous oscillation of said magnet assembly about said pivot bearing, said dip magnet housing being of greater buoyancy in said damping fluid than said damping base.

2. A magnetometer as claimed in claim 1 in which said dip magnet housing is substantially neutrally buoyant in said damping fluid.

3. A magnetometer as claimed in claim 1 in which the upper portions of said damping base are more buoyant than the lower portions.

4. A magnetometer as claimed in claim 1 in which said index means comprises a disc, having a circle inscribed thereon with the zero reference line being the diameter of the circle, said circle being slightly smaller in size than the viewing field of said means for viewing said index means.

5. A magnetometer as claimed in claim 2 in which the upper portions of said damping base are more buoyant than the lower portions.

* * * * *